March 20, 1962 J. L. SULLIVAN 3,026,377

COMPATIBLE RINGING CIRCUIT

Filed Oct. 10, 1957

INVENTOR
J. L. SULLIVAN
BY W. L. Keefauver
ATTORNEY

United States Patent Office 3,026,377
Patented Mar. 20, 1962

3,026,377

COMPATIBLE RINGING CIRCUIT

John L. Sullivan, Gillette, N.J., assignor to Bell Telephone Laboratories, Incorporated, New York, N.Y., a corporation of New York Filed Oct. 10, 1957, Ser. No. 689,385
5 Claims. (Cl. 179—87)

Figures 1, 1A:
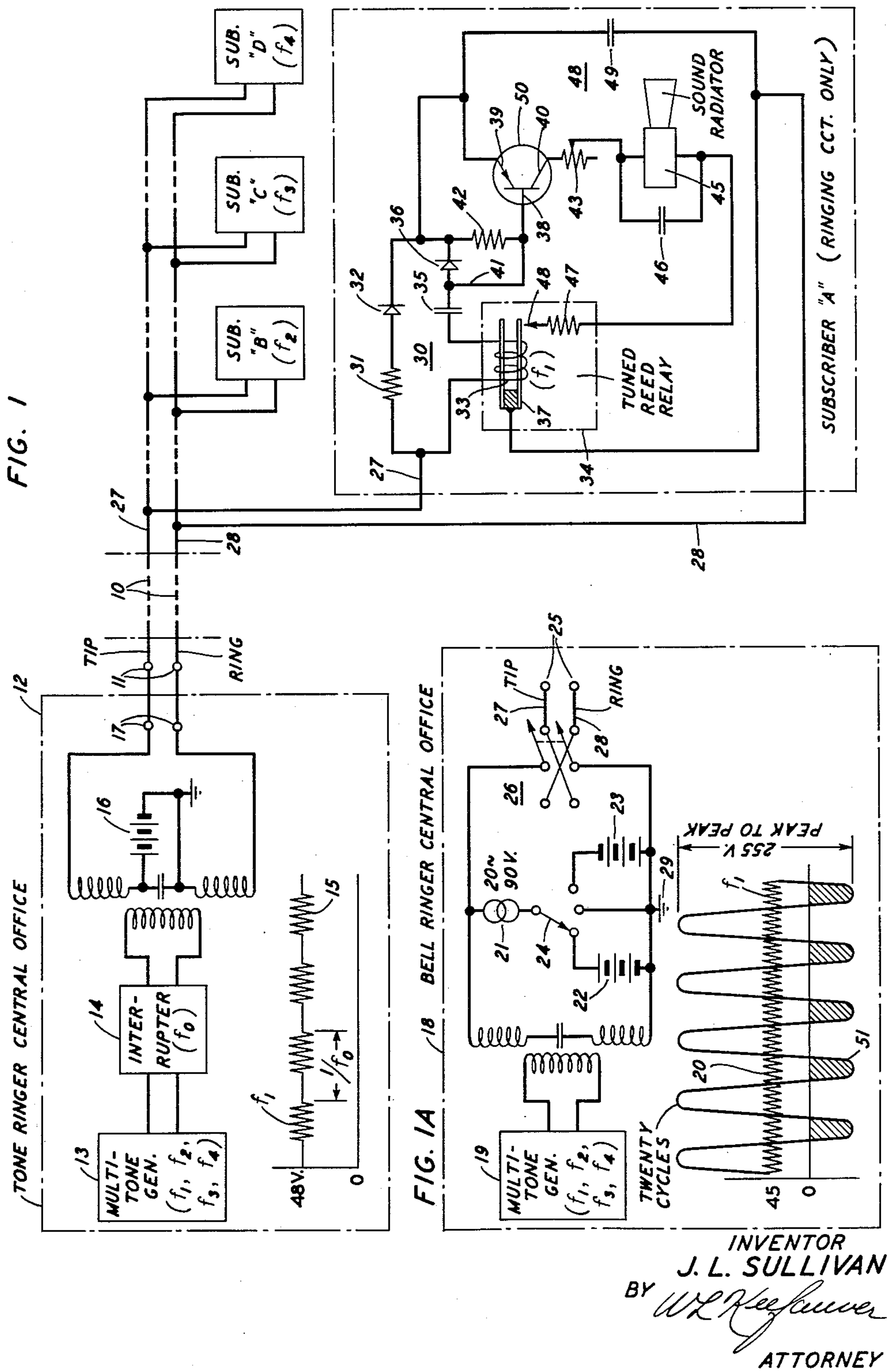

This invention relates to selective signaling systems and more particularly, to circuits providing full selective signaling in telephone systems using both tone ringing and conventional bell ringing currents.

Telephone systems have provided for selective ringing of as many as eight or more separate parties on a common party line by various arrangements which are well known in the telephone art. These arrangements have, in general, made use of differently tuned signal responsive circuits at each subscriber's station and a plurality of corresponding signaling frequencies generated at the central office. A specific frequency may then be used to ring a particular subscriber on the party line.

Telephone signaling systems have heretofore generally made use of a bell, equipped with an electrically operated clapper, as the signal responsive device. In order to operate such a bell, a low frequency high voltage alternating current signal has been used such as, for example, a 20-cycle 90-volt r.m.s. bell ringing signal. Full selective signaling systems for eight or more parties on a common party line have therefore been adapted to utilize such a bell ringing signal. One such arrangement is disclosed in F. J. Singer and L. J. Stacy Patent 2,532,125, issued November 28, 1950.

In many circumstances it is desirable to utilize an electroacoustic transducer with a horn rather than a bell and clapper as the ringing device in a selective signaling system of the type described above. Such a horn, when driven by a frequency selective amplifier, will provide an equally audible indication without the use of the high voltage signaling currents required for operating standard type bells. Such a signaling system, termed a tone ringing system, is disclosed in the copending application of L. A. Meacham and F. West, Serial No. 469,633, filed November 18, 1954, since matured into U.S. Patent 2,824,175, issued February 18, 1958.

A multiparty low voltage signaling system such as that described in the Meacham-West application may be advantageously employed, for example, in rural communities served by a rural carrier telephone system. In such a system it is desirable to employ low current voice frequency signaling, thereby allowing the signaling current to be modulated on the carrier and transmitted over the transmission facility, thus obviating the necessity for deriving a signal of conventional low frequency and high voltage from local power at the pole-mounted carrier terminals. Unfortunately, due to the use of a low voltage amplifier in the tone ringing systems, the bell and clapper ringing circuits and the electroacoustic horn circuits have been incompatible. That is, the high voltage bell ringing signal normally overloads and damages the sensitive low voltage amplifier circuits while the low voltage tone ringing signal is inadequate to operate the large bell clapper.

An object of the present invention is to separate high voltage, low frequency signals from low voltage higher frequency signals in a ulilization device responding to one or both of these signals.

Another object of the invention is to protect sensitive signal responsive devices from large currents transmitted over the signaling line.

A more specific object of the invention is to selectively signal a plurality of telephone subscriber's stations on a common transmission line by means of both tone ringing and bell ringing signals.

A further object of the invention is to increase the compatability of tone ringing and bell ringing telephone systems.

In accordance with the present invention, these and other objects are realized in one specific illustrative embodiment comprising a ringing circuit having a electroacoustic horn and two switching devices connected in series. The high level low frequency and direct current signals and the low level voice frequency signals are separated. The voice frequency signals are utilized to operate the switching devices and gate the direct current to the horn. More specifically, a low impedance path is provided for the voice frequency waves which includes two detecting devices. A first detecting device, for example, a tuned reed relay, detects the voice frequency signal and operates the first switching device. A second detecting device, for example, a rectifier, detects interruptions in the voice frequency signal and operates the second switching device. The electroacoustic horn responds to the operation of these two switching devices to produce an audible signal interrupted at the characteristic subaudible rate.

In accordance with one feature of the present invention, sensitive low voltage signal responsive devices are protected from high voltage signals by choosing proper impedance levels so as to isolate these components from the transmission line.

In accordance with another feature of this invention, multiparty full selective signaling is accomplished by the use of differently tuned frequency responsive detectors in the control branch of the signal dividing networks. More specifically, and in accordance with the illustrative embodiment, a plurality of tuned reed relays, each of which is tuned to respond to a different voice frequency, are employed as detectors.

These and other objects and features, the nature of the present invention and its various advantages, will be more readily understood by a consideration of the accompanying drawings and the following detailed description of these drawings.

In the drawings:

FIG. 1 is a schematic diagram of a compatible ringing system in accordance with the principles of the invention and shows the connection of a tone-ringing central office to the compatible ringing circuit; and FIG. 1A is a schematic representation of the selective signaling portions of a bell-ringing central office also suitable for connection to the compatible ringing circuit.

FIG. 1 is a schematic representation of a party-line telephone system including signaling circuits embodying the principles of the invention. This figure illustrates four telephone subscribers, designated subscribers A, B, C, and D, bridged on a common or party line 10 which extends by way of terminals 11 to central office 18. The ringing or signaling circuit of only subscriber A is illustrated in detail. The signaling circuits of the other subscribers are assumed to be similar.

To facilitate the understanding of this invention, the disclosure has been simplified by omitting the talking paths and disclosing only the selective ringer portions of the circuitry at subscriber A's station. Speech transmitting and receiving circuits of any of the many known types of telephone station sets may be utilized and are hence not illustrated.

Selective signaling is accomplished by the use of at least four different signaling frequencies, $f_1$, $f_2$, $f_3$ and $f_4$, which lie in the voice frequency range. These frequencies may, for example, be 478, 532, 591 and 656 cycles per second, so that the ratio of adjacent frequencies is 9 to 10. This ratio insures that neither second nor third harmonies of the lower frequencies coincides with a fundamental of any of the higher frequencies. If it is desired to signal more than four different stations on the party line 10, a generator capable of producing the appropriate number of different frequencies may be provided. Selectivity is achieved by tuning the signal-responsive circuit of each station to a different signaling frequency. Only one station on the party line will then respond to a signal of any particular frequency.

A tone-ringer central office, such as that shown at 12 in FIG. 1, provides ringing signals of these different audible frequencies by means of a multitone generator 13, the output of which may be interrupted at a subaudible frequency $f_0$, for example, twelve cycles per second, by interrupter 14, in order to give the resulting sound a distinctive character. The 48 volt battery 16 provides the necessary direct current for operating the subscriber's telephone sets. The interrupted tone is superimposed on the direct current voltage as shown by waveform 15. The voice frequency ringing signal may have, for example, an R.M.S. amplitude of three volts. The terminals 17 of tone-ringer central office 12 are connected to the terminals 11 of party line 10 in order to supply signaling frequencies to the connected subscribers A, B, C and D.

A bell-ringer central office, shown at 18 in FIG. 1A may alternatively be connected to terminals 11 of line 10 in FIG. 1. Bell-ringer central office 18 is supplied with a multitone generator 19, similar to multitone generator 13 in central office 12, for producing four or more distinctive voice frequency ringing signals. The voice frequency signals produced by tone generator 19, however, are not interrupted at a subaudible frequency rate and hence can be represented by waveform 20. This signal also may have an R.M.S. amplitude of three volts. A bell-ringing signal source 21 is also provided in central office 18 to produce a signal suitable for operating the bell clapper in a conventional bell-equipped subscriber's station, not illustrated. Signal source 21 may, for example, produce a 20-cycle alternating voltage wave having an rms amplitude of 90 volts. The relatively high voltage of the bell-ringing signal is necessary to move the comparatively large and massive mechanical bell clapper. A bell-ringing central office may readily be supplied with a multitone generator such as generator 19 at low cost and without interrupting service.

As is conventional practice, central office 18 is supplied with batteries 22 and 23, providing voltages of plus and minus 45 volts, respectively, in order to supply a direct current voltage of either polarity, by way of selector switch 24, to the line 10. Terminals 25 of central office 18 are connected to a line reversing switch 26 to alternatively connect tip conductor 27 or ring conductor 28 to ground point 29.

It can thus be seen that tone-ringer central office 12 of FIG. 1 provides a low voltage (three volts) audible frequency (478, 532, 591 or 656 cycles) signaling wave interrupted at a subaudible rate (twelve cycles) and superimposed on a direct current voltage (48 volts). This waveform is shown at 15. Bell-ringer central office 18, shown in FIG. 1A, on the other hand provides a low voltage uninterrupted audible frequency signaling wave and a high voltage (90 volts R.M.S., 255 volts peak-to-peak) subaudible (20-cycle) frequency bell-ringing signal, both superimposed on a direct current voltage. This waveform is shown at 20. The D.C. voltage supplied by central office 18 may be of either polarity and either conductor, tip conductor 27 or ring conductor 28, may be grounded. These provisions make possible four separate superimposed D.C. voltage conditions in the bell-ringer central office 18, i.e., plus voltage with tip grounded, plus voltage with ring grounded, minus voltage with tip grounded and minus voltage with ring grounded. These conditions are conventionally provided for selective signaling in an exclusively bell-equipped telephone system, not shown, and will not be hereinafter referred to except as affects the signaling circuits of the present invention. Waveform 20 illustrates the condition of positive battery 22 connected to tip conductor 27 with ring conductor 28 grounded. The other waveforms are readily apparent.

There have been described the various signals supplied to a party line by the illustrated tone-ringer central office 12 in FIG. 1 and the illustrated bell-ringer central office 18 in FIG. 1A. In accordance with the present invention, it is desired to provide a station signaling circuit which will selectively respond to signals generated at either of these central offices. If, for example, a telephone system is being changed from a bell-ringing system to a tone-ringing system to conserve power by eliminating the high bell-ringing signal voltages, each of the subscriber's stations may be equipped with a signaling device which is equally responsive to either of the two types of signals. It is then unnecessary to make the change-over of all subscribers' station apparatus simultaneous and service is not interrupted. This gradual change-over of subscribers' sets prior to central office changeover will reduce the cost of change-over by making simultaneous change-over unnecessary and by reducing or eliminating the period for which service is actually interrupted. Such a subscribers' ringing circuit, which may be termed a "compatible" ringing circuit, can be installed whenever it is convenient and can continue to be used with the bell-ringing signals. After central office change-over is completed, these same sets can also continue to be used with tone-ringing signals.

A detailed description of the compatible signaling circuit comprising an embodiment of the invention illustrated in FIG. 1 of the drawings will now be given. Tip conductor 27 of line 10 is connected in subscriber A's ringing circuit to a signal-branching circuit 30 having two parallel branches. A first branch, including coil 33 of a tuned reed relay 34, capacitor 35 and diode 36, presents a relatively high impedance to 20-cycle bell-ringing signals and blocks direct current while presenting a significantly lower impedance to a particular voice frequency signal. The other branch, including resistor 31 and diode 32, passes 20-cycle bell-ringing signals and direct current of the proper polarity. The manner in which these circuits function will now be described.

Tuned reed relay 34 has a vibrating tuning fork 37 which is mechanically tuned so as to resonate at a particular frequency in the voice frequency range, for example, $f_1$. These vibrations are induced in fork 37 by passing an alternating current of the resonant frequency ($f_1$) through coil 33. Coil 33 presents a very small impedance to signals of the resonant frequency and substantially higher impedances to signals of all other frequencies except, of course, harmonics of the fundamental resonant frequency. Vibrating reed relay 34 may be of any type known in the art such as, for example, that disclosed by G. E. Perreault in Patent 2,502,339, issued March 28, 1950, or any other form of narrow-band high-Q resonator.

It can be seen that tuned reed relay 34 operates as a filter to pass only a narrow band of frequencies centered on the resonant frequency of fork 37. Direct current is blocked in this branch by capacitor 35. This lower branch therefore presents a high impedance to direct currents as well as subaudible frequency signaling currents while presenting a substantially lower impedance to a voice frequency signal having a frequency equal to the resonant frequency of fork 37.

The upper branch of the parallel circuit 30, comprising resistor 31 and diode 32, passes subaudible frequency bell-ringing signals and direct current but, compared to the lower branch, presents a relatively high impedance to voice frequency signals of the resonant frequency. This is due in the main part to the relatively high value of resistor 31, for example 30,000 ohms, compared to the impedance of coil 33 at resonance, for example, 100 ohms. Resistor 31 limits the flow of direct current and 90-volt 20-cycle ringing current in the upper branch of circuit 30 in order to protect sensitive elements, to be described, located in succeeding portions of the circuit.

A second branching circuit 48 is connected in series with circuit 30 and the line conductors 27 and 28. One branch of circuit 48 includes a transistor 50, having a base electrode 38, an emitter electrode 39 and a collector electrode 40. Transistor 50 operates as a switch the emitter-collector path of which is normally disabled but which may be enabled by a signal of sufficient magnitude between base electrode 38 and emitter electrode 39. When enabled, transistor 50 presents substantially zero impedance between emitter electrode 39 and collector electrode 40. A suitable enabling signal is provided by way of lead 41.

Diode 36, in the lower branch of parallel circuit 30, operates as a rectifier to derive a direct current voltage from the voice frequency signals in this lower branch. The rectified voltage thus produced is stored on capacitor 35 and applied by way of lead 41 between the base electrode 38 and emitter electrode 39 of transistor 50. Resistor 42, in combination with capacitor 35 provides the proper time constant to stabilize the voltage output of rectifying diode 36. Diode 36, of course, rectifies only those signals which appear in the lower branch of parallel circuit 30, that is, those signals having a frequency corresponding substantially to the resonant frequency of tuned reed relay 34. Whenever such a signal is present on line 10, transistor 50 is maintained in a saturated condition by the rectified signal appearing on base electrode 38. This portion of the lower branch of parallel circuit 30 can therefore be conveniently described as a signal detector which detects the interruptions in a unique voice frequency signal on line 10 and in response to the presence of such interruptions enables transistor switch 50.

Connected to collector electrode 40 of transistor 50 is a variable resistance element 43, the other end of which is connected to an electroacoustic transducer 45. Transducer 45 may be any well known sound radiator which generates and radiates audible waves in response to an audible frequency input. Transducer 45 is by-passed by capacitor 46 at high frequencies to prevent chattering.

Transducer 45 is connected through a resistor 47 to a contact 48 which is arranged to contact vibrating fork 37 once in each cycle of vibration. Thus, contact 48 and fork 37 operate as a switch which is closed once for each cycle of fork 37 and hence is closed at a rate equal to the resonant frequency of tuned reed relay 34. Resistor 47 is provided to reduce sparking at contact 48. Fork 37 is returned to ring lead 28 of line 10. A capacitor 49 comprises the second branch of circuit 48 and shunts the voice frequency signals from transistor 50 and transducer 45, provides low impedance coupling between input and output circuits, minimizes feedback and protects against instability.

The manner in which the circuit described above operates to provide full selective signaling for both bell-ringing signals and tone-ringing signals is as follows:

Assuming initially that tone-ringer central office 12 is connected to line 10 as illustrated in FIG. 1, the circuit operation takes place in the following manner. The voice frequency tone generated in tone generator 13 of central office 12, assumed now to be at the resonant frequency $f_1$ of fork 37 which is unique to subscriber A, finds a low impedance path through subscriber A's ringing circuit by way of coil 33, capacitor 35, diode 36 and capacitor 49. This is, of course, assuming that fork 37 of reed relay 34 is tuned to the exact frequency being generated by tone generator 13. This voice frequency signal will encounter a much higher impedance in resistor 31 and hence substantially all of the voice frequency current will flow through coil 33. The direct current supplied by battery 16 in central office 12 will be blocked by capacitor 35 in the lower branch of parallel circuit 30 and will therefore flow only through resistor 31 and diode 32, which is poled for such conduction.

Returning to tuned relay 34, it will be noted that when a voice frequency signal is present in coil 33, contact 48 will be connected through fork 37 to ring conductor 28 at an audible frequency rate equal to the resonant frequency of the tuning fork 37. Simultaneously, a direct current will be obtained by rectifying diode 36 to saturate transistor 50. As long as the voice frequency tone continues, transistor switch 50 will remain closed and contact 48 will alternately be connected and disconnected to and from line 28. The direct current supplied by way of resistor 31 and diode 32 will, therefore, be alternately conducted and not conducted through transducer 45 at an audible frequency rate. This audible frequency "square wave" is transformed into audible sound by transducer 45. Rheostat 43 is provided so that subscriber A can control the volume of the audible output of transducer 45 by adjusting the amount of voltage delivered thereto. Resistor 31 limits to a safe value the current drawn through transistor 50.

It will be recalled that, as shown by waveform 15, the audible frequency signal generated in tone generator 13 is interrupted at a subaudible frequency rate by interrupter 14. These subaudible interruptions must also be reproduced by subscriber A's ringing circuit in order to produce an audible tone of a distinctive character. This is accomplished by the rectifying action of diode 36. Thus, when no audible signal is present, the rectified direct current voltage on lead 41 drops to zero. The drop in voltage at base electrode 38 of transistor 50 cuts off the transistor and opens up the circuit including transducer 45 and no driving signal is provided for transducer 45 during the periods when waveform 15 is interrupted. This provision is necessary because fork 37 of relay 34 tends to continue to vibrate even after the driving signal is removed and would, therefore, "coast" through the interruption intervals. The reason for this is that the high-Q tuned fork has insufficient bandwidth to recognize the sidebands on the fundamental frequency, caused by the 12-cycle interruption rate, and hence does not furnish the subaudible interruptions.

Subscribers B, C and D are provided with similar ringing circuits but each having a tuned reed relay which responds to a different voice frequency, for example, $f_2$, $f_3$ and $f_4$. Selective signaling is therefore accomplished by generating a tone of the proper voice frequency in tone generator 13 of central office 12. These frequencies are chosen to have sufficient separation so that the tuned relay of one subscriber's ringing circuit will not respond to the signaling frequency, or any harmonic thereof, of another subscriber.

Assuming now that bell-ringing central office 18 of FIG. 1A, rather than tone ringer central office 12 of FIG. 1 is connected to line 10, the operation of the ringing circuit is as follows:

The voice frequency signal generated by tone generator 19 of central office 18 is, as before, substantially confined to the lower branch of parallel circuit 30. Contact 48 is, therefore, successively connected to ring conductor 28 through fork 47 at the voice frequency rate. Since the output of tone generator 19 is not interrupted, as shown by waveform 20, transistor switch 50 is continuously forward biased by the voice frequency signal. The characteristic subaudible interruptions therefore must be derived in another manner.

It will be remembered that a battery 22 or 23 is supplying direct current to line 10 and that a signal source 21 is supplying a 20-cycle bell-ringing signal to line 10. When these two voltages are superimposed upon one another, the resulting waveform is positive for some portion of each cycle of generator 21 and is negative for the remaining portion of each cycle. This is illustrated by waveform 51 where the negative portion is cross-hatched. The relative proportions of these two portions of the cycle are dependent upon whether battery 22 or battery 23 is connected by way of switch 24 to generator 21. For example, if battery 22 is connected to source 21, the waveform appears as shown at 51. When battery 23 is connected to source 21, the waveform is inverted and the cross-hatched portion becomes positive. In either case, however, a significant portion of the resulting waveform will be positive during each cycle. The operation of reversing switch 26 merely serves to interchange the positive and negative portions of each cycle.

Returning to the subscriber's ringing circuit, it can be seen that instead of a direct current flowing through resistor 31, a 20-cycle alternating current will appear in this branch of parallel circuit 30 which will have a 45 volt bias with respect to ground due to battery 22 or 23. During the positive portion of each cycle, current is freely passed through transistor 50 and transducer 45. During the negative portion of each cycle, however, the base to emitter path of transistor 50 is reverse biased by the negative portion of 20-cycle signal and current cannot flow through transistor 50. Since this alternating current wave has a frequency of 20 cycles per second, the audible output of transducer 45 is interrupted at a subaudible 20-cycle rate. Diode 32 serves as a switch to prevent current flow during the negative portions of the 20-cycle signal. By thus limiting the current, diode 32 increases the bridging impedance across line 10 when bell-ringing central office 18 is signaling.

It is apparent from waveform 51 that when positive battery 22 is connected to tip conductor 27, the portion of each cycle passed by transistor 50 is substantially greater than when negative battery 23 is connected to tip conductor 27. This would normally result in a much higher volume of sound for a subscriber being signaled in the former manner than in the latter. An adjustment of variable resistance 43 will, however, bring both of these audible signals to the desired level. Such an adjustment would not have to be changed for each signal because bell-ringer central office 18 of FIG. 1A will deliver the same type of ringing signal to a particular subscriber all of the time. That is, a particular subscriber is always signaled by only one of the four possible arrangements: plus voltage with tip grounded, plus voltage with ring grounded, minus voltage with tip grounded or minus voltage with ring grounded.

To give a more complete understanding of the invention, a list of certain componet values found to be satisfactory for the illustrated embodiment of the invention is given below. The invention, however, is not limited to these specific values.

| | |
|---|---|
| Reistor **31** | 30,000 ohms. |
| Diodes **32** and **36** | Silicon junction diodes. |
| Coil **33** impedance (at resonance) | 100 ohms (approximate). |
| Capacitor **35** | 0.0143 microfarad. |
| Resistor **42** | 1000 ohms. |
| Variable resistor **43** | 25,000 ohms. |
| Capacitor **46** | 5100 micromicrofarads. |
| Capactor **49** | 0.5 microfarad. |
| Transistor **50** | Type 1778 p-n-p. |

The frequency selective portion of the ringing circuit comprising the illustrative embodiment of the invention has been shown and described as a tuned reed relay. It may just as easily, however, take the form of a tuned amplifier having a narrow range of frequency response such, for example, as that described in the copending application of L. A. Meacham and F. West, Serial No. 469,633, filed November 18, 1954. Similarly, transistor switch 50 may also comprise any form of low loss, fast acting, electronic switch such as, for example, a diode gate. It is in accordance with the present invention, however, to provide two switching means in series with an electroacoustic transducer; to provide a first detector responsive to a particular voice frequency signal for enabling one of these switching means; and to provide second detector means responsive to subaudible frequency signals for enabling the other switching means.

It is to be understood that the above-described arrangements are merely illustrative of a small number of the many possible applications of the principles of the invention. Numerous and varied other arrangements in accordance with these principles may readily be devised by those skilled in the art without departing from the spirit or scope of the invention.

What is claimed is:

1. A telephone signaling circuit responsive to at least two classes of input signals comprising an electroacoustic transducer, a transistor and a tuned reed selector having a vibratory contact element connected in series with said transducer and the collector-emitter path of said transistor, means including a winding on said selector responsive to selected audible frequency components of said input signals for operating said contact element at said selected audible frequency, said means also enabling said collector-emitter path.

2. In combination, a transmission line, an electroacoustic transducer, first and second switching means connected in series with said transducer across said transmission line, means responsive to a selected audible frequency on said transmission line to operate said first switching means at said audible frequency rate, and detecting means responsive to subaudible modulations of said audible frequency to operate said second switching means at said subaudible frequency rate.

3. The combination according to claim 2 wherein said first switching means comprises a tuned reed selector having a vibratory contact element.

4. The combination according to claim 2 wherein said second switching means comprises a transistor having base, emitter and collector electrodes and wherein said emitter and collector electrodes are connected in series with said transducer.

5. A signaling system comprising a central office and a plurality of substations, said central office and said substations being connected to a common transmission line, means at said central office for selectively applying to said line calling signals having distinctive audible frequency components and common subaudible frequency components, and signaling means at each of said substations responsive to a unique one of said calling signals, each of said signaling means comprising an electroacoustic transducer, a tuned reed selector and a transistor having base, emitter and collector electrodes, said tuned reed selector having a vibratory element responsive to one of said distinctive audible frequency components and a contact element for making contact through said vibratory element on each vibration thereof, means connecting said transducer, said contact element and the emitter-collector path of said transistor in series across said line, means for coupling said vibratory element with said line whereby said vibratory element closes said contact element on each cycle of said one distinctive audible frequency component, means for detecting said subaudible frequency components of said calling signals, and means connecting the output of said detecting means to said base electrode whereby said collector-emitter path is made alternately conductive and non-conductive at said subaudible frequency rate.

References Cited in the file of this patent

UNITED STATES PATENTS

| | | |
|---|---|---|
| 2,626,384 | Winkler | Jan. 20, 1953 |
| 2,717,279 | Matlack | Sept. 6, 1955 |
| 2,808,463 | Jenkins | Oct. 1, 1957 |
| 2,837,605 | Hochgraf | June 3, 1958 |
| 2,850,650 | Meacham | Sept. 2, 1958 |